Feb. 6, 1934.  J. M. BOWMAN ET AL  1,945,514
SHIELD FOR AGRICULTURAL IMPLEMENTS
Filed Dec. 26, 1930   3 Sheets-Sheet 1
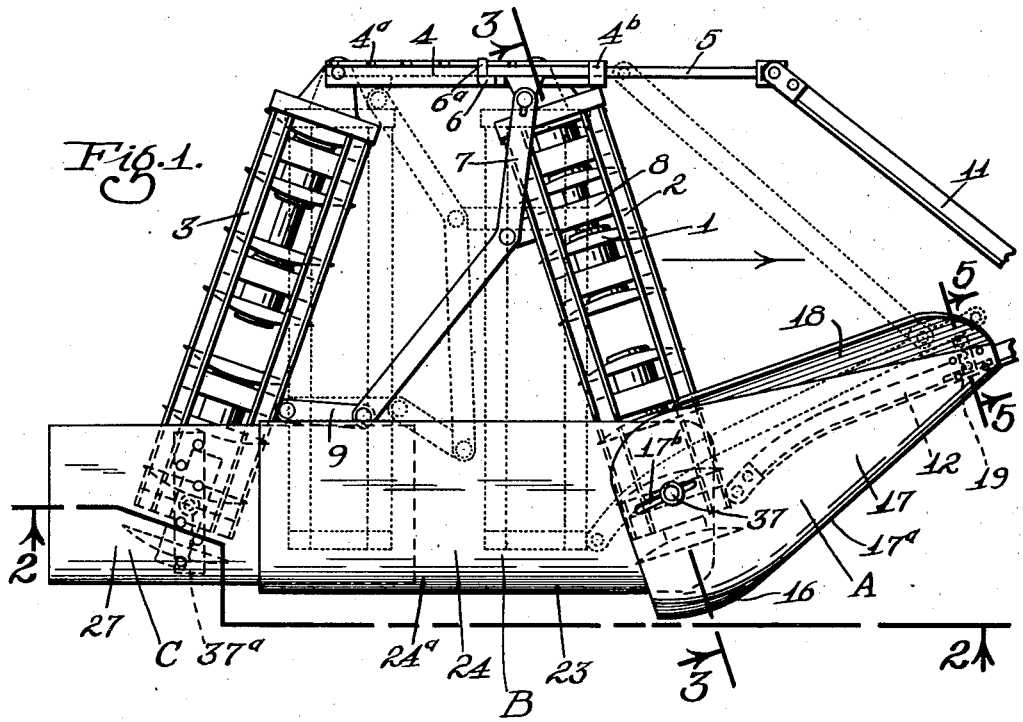
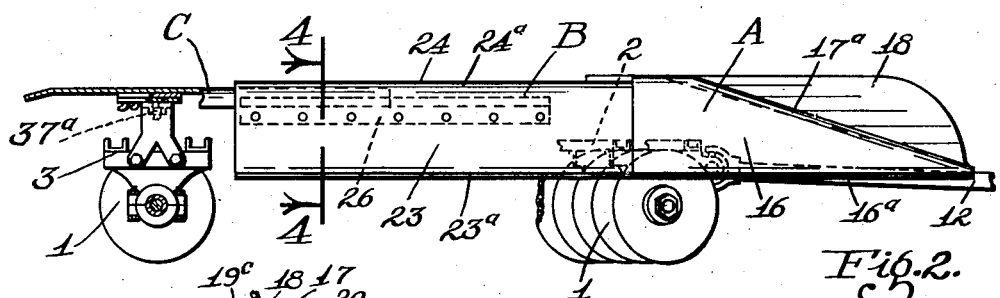
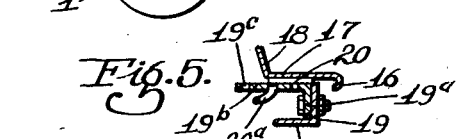
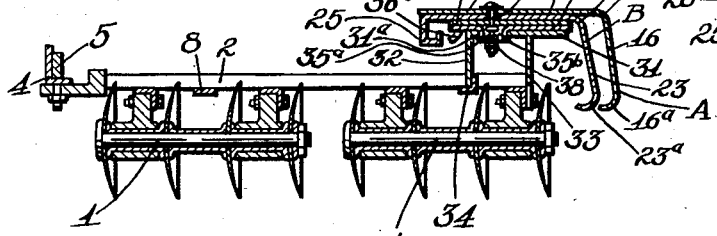
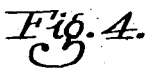
INVENTORS
JOHN M. BOWMAN
BY SAMUEL BOWMAN
A. B. Bowman
ATTORNEY Feb. 6, 1934.    J. M. BOWMAN ET AL    1,945,514
SHIELD FOR AGRICULTURAL IMPLEMENTS
Filed Dec. 26, 1930    3 Sheets-Sheet 2
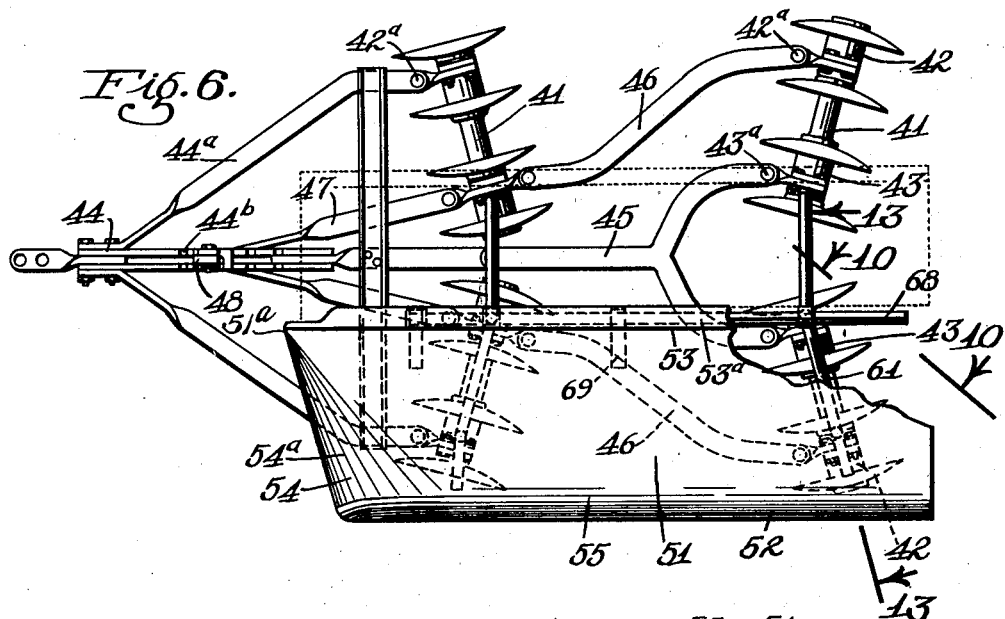
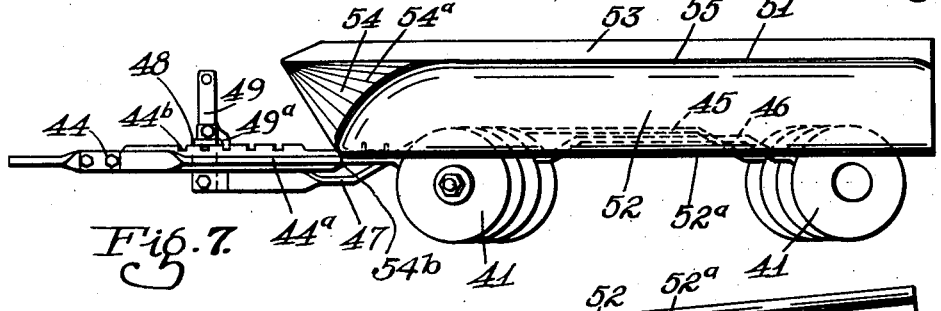
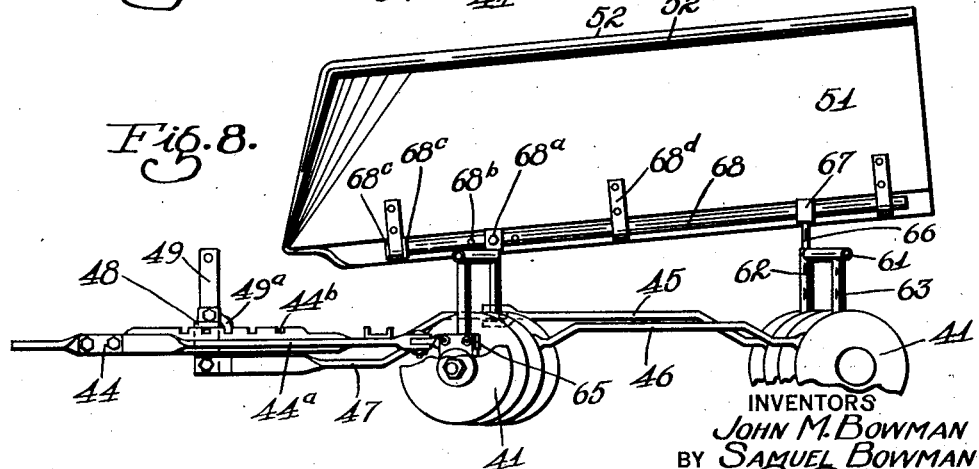
INVENTORS
JOHN M. BOWMAN
BY SAMUEL BOWMAN
A. B. Bowman
ATTORNEY Feb. 6, 1934. J. M. BOWMAN ET AL 1,945,514
SHIELD FOR AGRICULTURAL IMPLEMENTS
Filed Dec. 26, 1930 3 Sheets-Sheet 3
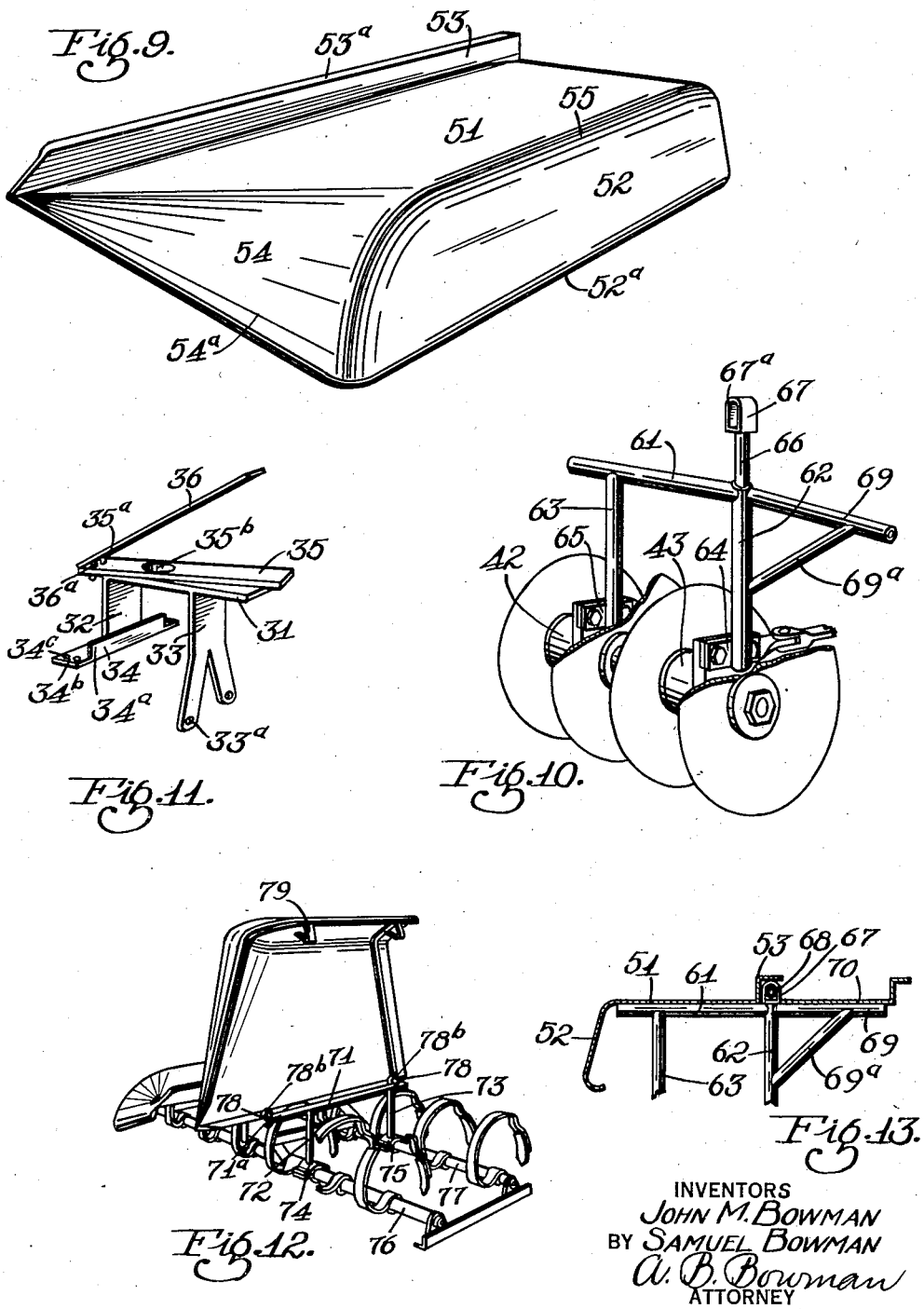
INVENTORS
JOHN M. BOWMAN
BY SAMUEL BOWMAN
A. B. Bowman
ATTORNEY Patented Feb. 6, 1934

1,945,514

UNITED STATES PATENT OFFICE 1,945,514

SHIELD FOR AGRICULTURAL IMPLEMENTS

John M. Bowman, Santa Ana, and Samuel Bowman, Los Angeles, Calif.

Application December 26, 1930
Serial No. 504,747

13 Claims. (Cl. 97—192)

Our invention relates to shields or fenders for agricultural implements, such as discs and other harrows, and adapted to be mounted on various kinds and sizes of discs and harrows in general or other implements.

The objects of our invention are: first, to provide a shield of this class whereby, when an agricultural implement with the shields attached is driven through an orchard, the foliage and fruit of the trees are picked up and passed over the implement and then lowered without injury to the foliage or bruising of the fruit; second, to provide a shield of this class whereby the foliage of trees, shrubbery, bushes, and the like, are not cut, broken, or unnecessarily distorted when engaged by the shield, such safety or protecting feature to the foliage being provided by amply rounded corners and general stream lining at the exposed or projecting portions of the shield; third, to provide a shield of this class whereby the foliage and fruit encountered by the shield is either carefully picked up by the shield and carried over the top of the same, or is easily deflected to the side thereof by reason of the peculiar construction of the forward end of the shield; fourth, to provide a shield of this class whereby the foliage and fruit passing over the top, or along the side of the shield is prevented from sliding into the cutting or operating parts of the implement; fifth, to provide a shield of this class that may be easily raised, thereby permitting access to the under side of the shield and to the mechanism of the implement; sixth, to provide a shield of this class which is so constructed that the implement is permitted freely to be adjusted pivotally and longitudinally thereunder, and which at the same time completely covers the implement during such movement or adjustment; seventh, to provide a shield of this class that may be easily and quickly attached; eighth, to provide a shield of this class that may be easily removed by merely a substantially vertical lift; ninth, to provide a shield of this class having a nose piece thereon adapted to turn with the draw member of the implement; tenth, to provide a shield means of this class which may telescope freely during manipulation or operation of the implement or when adjusting the implement; eleventh, to provide simple and novel supporting means for the shield members on the implement; and, twelfth, to provide a shield means of this class that is simple and economical of construction, durable, neat in appearance, and one which will not readily deteriorate or get out of order.

With these and other objects in view, as will appear hereinafter, we have devised a shield means for agricultural implements, having certain novel features of construction, combination and arrangement of parts and portions, as will be hereinafter described in detail and particularly set forth in the appended claims, reference being had to the accompanying drawings and to the characters of reference thereon which form a part of this application in which:

Figure 1 is a plan view of one form of our shield means applied to, or mounted on, one design of disc harrow, and showing by dotted lines the harrow in contracted position; Fig. 2 is a partial side elevational and partial sectional view thereof taken at 2—2 of Fig. 1; Fig. 3 is a sectional view thereof taken at 3—3 of Fig. 1; Fig. 4 is a sectional elevational view of the shield taken at 4—4 of Fig. 2; Fig. 5 is a sectional elevational view thereof taken at 5—5 of Fig. 1; Fig. 6 is a plan view of a second form of our shield means applied to, or mounted on, a disc of different design than that shown in Fig. 1; Fig. 7 is a side elevational view of the disc and shield shown in Fig. 6; Fig. 8 is a side elevational view of the disc and shield shown in Fig. 6, with the shield raised to a substantially vertical position and with the rear end portion thereof raised partially from its support; Fig. 9 is a perspective view of the shield shown in Figs. 6, 7 and 8 separate and apart from the implement or supporting means; Fig. 10 is a perspective view of one of the sets of discs shown in Figs. 6, 7 and 8, showing the shield supporting brackets mounted thereon; Fig. 11 is a fragmentary perspective view of one of the brackets used in connection with the shield shown in Figs. 1, 2 and 3, and shown separate and apart from the shield and discs; Fig. 12 is a perspective view of our shield means applied to a spring toothed harrow, and showing the shield in a raised position, and Fig. 13 is a sectional view through 13—13 of Fig. 6.

Like characters of reference refer to similar parts and portions throughout the views of the drawings.

The disc harrow shown in Figs. 1, 2 and 3 is of the design known in the trade as a Towner disc harrow, and consists essentially of four sets of discs rotatably supported by supporting frames 2 and 3. These supporting frames 2 and 3 are pivotally mounted and connected at one end to the opposite ends of an angle frame member 4. Along the upper edge of the vertical portion of the angle member 4 is a multiplicity of notches 4a, the purpose of which will be hereinafter described.

Positioned at the forward end and upper portion of the member 4 is a yoke 4b through which a bar 5 is slidably mounted. Secured to the rear end of the bar 5 is a lever 6 provided with a pawl 6a which engages the notches 4a for preventing the bar 5 from sliding longitudinally relative to the member 4. Pivotally connected to the rear end of the bar 5 and forwardly of the pawl 6a is an arm 7 pivoted intermediate its ends on a bracket 8 secured to the frame 2, the opposite end of the arm 7 being connected to the frame 3 by means of a link 9. The forward end of the bar 5, (the direction of movement being indicated by the arrow in Fig. 1) is pivotally connected to an angle member 11 which forms a part of a means for drawing the implement, the other portion of the drawing means being the member 12 which is pivotally connected to the free end of the frame 2. Thus, it is seen that when the bar 5 is shifted forwardly with respect to the frame member 4, the free ends of the frames 2 and 3 are separated and the angle between the frames 2 and 3 is varied, and at the same time the forward ends of the draw bars 11 and 12 are moved to such a position that the resultant pull is always substantially parallel to the member 4, as shown by the arrow. The frames 2 and 3 are held in any angular position desired by the pawl 6a engaging the notches 4a of the member 4.

The shield means shown in Figs. 1 to 4, inclusive, and mounted on the disc described, is of a telescoping type and consists of a nose piece A, a central main shield member B, and a telescoping rear piece C. The nose piece A is shaped substantially as shown in Figs. 1 and 2, and consists essentially of an apron 16, along its outside edge, a plane surface portion 17 at its upper side, and an inclined surface portion 18 along its inside edge. The plane surface portion 17 is inclined upwardly from its forward to its rear end, thus, making the apron 16, which is substantially horizontal along its lower rounded edge 16a, narrow at the forward end and of considerable width at the rear end. The inclined surface 18 is correspondingly made wide at the forward end and narrow at the rear end, as shown best in Fig. 2, and extends at an angle upwardly and inwardly toward the longitudinal axis of the implement from the inner edge of the portion 17. The forward end of the portion 17 of the nose piece is very narrow and tapers backwardly therefrom to the rear end where it is of considerable width. The corner 17a joining the plane surface portion 17 and the apron 16 is rounded and of comparatively large radius, providing a very smooth edge with which the foliage of the trees, bushes or shrubs initially comes in contact. The apron 16 prevents any foliage passing along and against the outside edge of the implement from getting under the disc members and being cut thereby. The plane surface portion 17 passes under the foliage and fruit, picks up the same and permits the same to pass thereover to the top of the main shield member B, the inclined surface portion 18 preventing the foliage from sliding off the inner side edge of the nose piece A into the cutting or operating parts of the implement. The forward end of the nose piece A is hingedly mounted on the draw bar member 12 by means of the small bracket 19 and a hinge member 20 secured to the under side of the nose piece. The bracket 19 consists of a flat portion 19a, which is bolted to the upright flange of the draw bar member 12, and a horizontal portion 19b bent at right angles to the member 19a. The portion 19b is provided with holes 19c, into one of which fits a hook 20a formed as a part of the hinge member 20, all of which is best shown in Figs. 1 and 5. With the pivot mounting here shown, the forward end of the nose piece may be raised clear of the bracket 19 when the whole shield is raised to a vertical position about its inner edge, as will be more specifically described hereafter. The rear portion of the nose piece is pivotally connected on a vertical axis to the central main shield member B, as will be hereinafter described.

The central main shield member B is shaped substantially rectangular in plan and consists of a plane longitudinal surface portion 24 and an apron 23 along the outside edge thereof, the lower edge of the apron being on substantially the same horizontal line as the lower edge of the apron 16 of the nose piece A. The longitudinal surface portion 24 is provided along the inside edge with a depending channel 25. The lower edge of the apron 23 is provided with an inwardly turned rounded edge 23a which prevents injury to any foliage or fruit coming in contact therewith and also provides a smooth grip for the hands when raising the shield member upwardly. The corner 24a, joining the horizontal surface portion 24 and the apron 23, is rounded, and of comparatively large radius, providing a very smooth edge with which the foliage comes in contact. The channel 25 is of rectangular cross section having a lower bottom portion 25a connected at its inner edge to the inner edge of the portion 24 and provided at its outer edge with an upright portion 25b. This channel provides one of the guides for the telescoping rear piece C. Another guide 26 for the rear piece C is positioned longitudinally along the inner side of the apron 23. This guide 26 is also provided with a bottom portion 26a and an upright portion 26b at its inner edge. The forward end of the main shield member B is pivotally mounted on a bracket supported by the frame 2, which bracket and mounting will be hereinafter described.

The rear piece C is adapted to telescope within the main shield member B and consists of a plane horizontal surface portion 27 and downwardly extending channels 28 and 29 extending longitudinally along the inner and outer edges thereof, and adapted to slide in the channels 25 and 26, respectively, of the main shield member B. The corner joining the horizontal surface of the outer side of the outer channel 29 is a smooth rounded corner of substantially the same shape and curvature as the corner 24a on the main shield member B. Thus, when the telescoping rear piece C is extended inwardly, there are no sharp corners exposed to cut the foliage of the trees and the like. Since the rear end of the central shield member B extends substantially over the end of the frame 3 when extended backwardly to its extreme position, no apron need be provided at the outer edge of the rear piece C. The rear piece C is pivotally supported on the frame 3 in substantially the same manner as the forward end of the main shield member B; and is adapted to telescope within the main shield member B, thereby permitting the angle between the frames 2 and 3 to be varied.

The brackets supporting the forward end of the main shield member B and the telescoping rear piece C are of substantially the same construction, each consisting of a horizontal plate 31, and two downwardly extending legs 32 and 33, respectively, at the inner end and near the outer end thereof, as shown best in Figs. 3 and 50

11. Welded or otherwise secured to the lower end of the leg 32 is an angle member 34 positioned parallel to the longitudinal extent of the shield members, and provided at its ends with securing holes 34c, as shown in Fig. 11, for securing the brackets to the frames 2 and 3. The lower end of the leg 33 is split and spread to form an inverted Y. Each leg of the Y is provided with securing holes 33a so spaced that the bolts regularly employed in securing the bearing supports for the disc members on the frames 2 and 3, may be used in securing the leg 33 to the frames 2 and 3, thus, eliminating the necessity of drilling holes in the frame for securing the brackets thereto. Pivotally secured to the plate 31 is a second plate 35 of a length slightly greater than the length of the plate 31.

In the case of the forward bracket the pivotal mounting of the plate 35 is as follows: The plate 31 is provided with a relatively large hole 31a into which is positioned a hollow boss 35a formed from the plate 35, the lower edge of the boss being extended for holding the plate 35 in position, thus providing a very simple and economical pivot means, all of which is best shown in Fig. 3. With this type of pivot a large hole 35b is formed through the center and through which extends the lower end of the bolt 37 used in pivotally connecting the nose piece A to the shield member B.

In the rear bracket the plate 35 is pivotally connected to the plate 31 by means of a bolt 37a positioned with its head in a countersunk recess in the plate 35 to prevent the bolt from extending above the surface of said plate.

Hingedly connected to the plate 35 of each bracket is a third plate 36 which is riveted or otherwise secured to the undersides of the shield member B, in one instance, and the telescoping rear piece C in the other. The hinge connection between the plates 35 and 36 consists in each instance of two arcuate rods or hinge members 36a welded to the inner end of the plate 36 and extending through holes 36c in the coincident ends of the plate 35. With this type of hinge the shield may be removed from the brackets by a vertical lift when the shields are raised to a substantially vertical position. In order further to prevent the rods or hinge members 36a from being removed from the holes 35c when the shield is in the lowered position, the ends of the rods or hinge members 36a may be provided with cotter pins.

The rear end of the nose piece A is pivotally connected on a vertical axis to the forward end of the main shield member B and the plate 36 by means of the bolt 37 aforementioned, the bolt also holding the forward end of the member B against the forward bracket. A spring 38 is positioned around the bolt between the nut thereon and the forward plate 36, thereby providing a yieldable and resilient connection. This bolt is adapted to extend into the opening 35a of the plate 35 when the shields are in their lower positions, as shown in Fig. 3. The nose piece A is provided with a longitudinal slot 17a through which the bolt 37 extends, thus permitting the draw bar members 11 and 12 to be raised and lowered, as when the disc is in use. This slot also permits the shield members to be raised to a vertical position about their hinged connections, in which case the nose piece telescopes or slides with respect to the central shield member B along the bolt 37.

The implement shown in Figs. 6, 7, 8 and 10 is of a different construction than that shown in Figs. 1, 2 and 3, and consists of four sets or gangs of discs 41, arranged in a forward pair and a rear pair, each gang supported at its outer end by a bearing 42 and at its inner end by a bearing 43, and consists further of a main draw bar 44, and auxiliary connecting members hereinafter described. The angle at which the sets of gangs or discs are set relative to the direction of movement may be varied at will, the front gang being pivoted at their outer ends about pivots 42a connecting the bearings 42 to the draw bar 44 by diagonal braces 44a, while the rear gangs are pivoted at their inner ends about pivots 43a which connect the rear gangs to the draw bar by a rearwardly forked linking bar 45. The bearings 42 of the rear gangs are pivotally connected to the bearings 43 of the forward gangs by means of connecting links 46, and are in turn slidably connected to the draw bar by means of links 47 and a slide 48. The slide 48 is locked to the draw bar 44 by means of a latch 49 having a pawl 49a which is adapted to engage notch portions 44a in the draw bar 44. Referring to Fig. 6, it is seen that if the slide 48 is moved longitudinally relative to the draw bar 44 the angle at which the gangs of discs are set relative to the direction of travel will be varied.

The shield means in connection with the implement just described is preferably of one piece and consists of a plane horizontal surface portion, or upper wall, 51, a downwardly extending apron 52, along the outside edge, an upwardly extending flange 53 extending longitudinally along the inner edge of the shield member, and a peculiar shaped nose 54. The apron 52 is positioned at a slight obtuse angle with respect to the horizontal surface portion 51 and is joined thereto by a considerably rounded corner portion 55. The nose 54 extends in considerably rounded form from its lower front edge upwardly and backwardly and merges with the forward end of the top wall, as shown best in Fig. 9. The forward end of the inner edge of the front wall is positioned considerably ahead of the front end of the apron and is connected to the front end of the apron by the nose which is substantially in the form of a cone with its apex at the forward end of the inner edge of the top wall 51. This nose may best be defined as a warped plane generated with the elements, designated 54a, having one end fixed at the point 51a at the forward end of the inner edge of the top wall 51, and the other end of the elements 54a moving along the curve at the forward end of the apron 52 as a directrix. The lower edge 54b of the nose extends angularly from the front end of the lower edge 52a of the apron 52 to the point 51a. Such shape of the nose, permits the fender to be formed easily from heavy gauge material, and also provides a gradually rounded nose for picking up the foliage and fruit and directing the same over the upper wall 51. The lower edge 54b is rounded inwardly, as is also the lower edge 52a of the apron 52, as is illustrated in connection with the side aprons in the first mentioned structure, shown best in Figs. 3 and 4, to prevent sharp edges coming in contact with the foliage or fruit of the tree.

The upwardly extending flange 53 is relatively narrow and the upper edge terminates in a narrow horizontal ledge 53a. This upwardly extending flange, together with the horizontal ledge 53a serves a dual purpose: first, it prevents any foliage or fruit passing over the shield member from sliding beyond the inner edge thereof; and, second it provides a cover or partial enclosure over the hinge means, to be hereinafter described.

The brackets supporting the shield member just described on the implement is best shown in Figs. 8 and 10. This bracket may be made of common wrought iron pipe and consists of a horizontal or cross pipe 61 and two upright pipes 62 and 63 secured at their upper ends to the pipe 61 and at their lower ends respectively to the bearings 43 and 42. The upper end of the pipe 62 is open and is flush with the upper edge of the horizontal pipe 61. The outer end of the horizontal pipe 61 extends beyond the upright pipe 63 forming a support over substantially the whole inner side of the horizontal wall portion of the shield member. Secured to the lower ends of the upright pipes 62 and 63 are flat plates 64 and 65 respectively which are provided with holes for securing the plates to the bearings 43 and 42 by the same bolts used in securing the bearings in place. Reciprocally and rotatably mounted in the upper open end of the upright pipe 62 is a smaller pipe 66 provided at the upper end with an eye member 67 having an opening 67a through which extends the shield supporting pipe 68. The width of the opening 67a is slightly greater than the diameter of the pipe 68 and the height is considerably greater than the diameter of the pipe 68 to permit the implement to rock and twist without binding or distorting the pipe 68. The eye 67 is intended to rest and turn on the upper end of the pipe 62, while the shield member rests on the horizontal pipe 61. The eye 67 on the forward bracket is provided with a hole in which is screwed a bolt 68a, which bolt extends through a hole 68b in the pipe 68 for preventing the pipe 68 sliding longitudinally with respect to this bracket, the rear eye and bracket being forced to move relative to the shield member. It will be noted that the pipe 68 is provided with several holes 68b thereby permitting the position of the shield member relative to the front end of the implement to be varied. The shield member is hingedly secured to the pipe 68 by means of hinge straps 68d. Mounted on the pipe 68, and adjacent both sides of the forward hinge strap 68d, are collars 68c for preventing the shield from sliding longitudinally with respect to the pipe 68. The horizontal surface portion 51 of the shield rests on the horizontal pipes 61 of the brackets and slides thereon when any turning or longitudinal movement of the implement takes place. From the foregoing description of the brackets and the mounting of the shield member thereon it is easily seen that the shield member may be readily removed from the brackets by a vertical lift, and that when the shield member is in place, free movement of the implement and the gangs under the shield is permitted.

Although with the type of disc harrow shown in Figs. 6 to 10, inclusive, only one shield member is used, as shown, it is obvious that the shield means shown may be duplicated for the opposite sides by merely reversing the parts.

It will be here noted that the brackets described in connection with the shield means, shown in Figs. 1 to 4, inclusive, may be adapted to the shield means and implement shown in Figs. 6 to 10, inclusive, and also that the brackets described in connection with the shield means, shown in Figs. 6 to 10, inclusive, may be used with the shield means and implement shown in Figs. 1 to 4, inclusive; and we do not wish to limit the use of either bracket construction to one certain shield means, but desire to use alternately the several brackets with the various shield means.

It will be further noted that the nose piece shown and described in connection with the shield means shown in Figs. 1 to 4, inclusive, may be adapted to the shield shown in Figs. 6 to 9, inclusive. If the nose piece A is applied to the one piece shield member shown, the nose of the latter would not be rounded to as large an extent as when a separate nose piece is not used therewith.

Fig. 12 shows our shield means applied to a spring toothed harrow. The shield here shown is constructed similar to that shown in Fig. 9, differing only in the length thereof. The bracket supporting the shield member on this harrow member, made of pipe and as shown, consists of a horizontal pipe 71 and two upright pipes 72 and 73 welded at right angles to the pipe 71 with the ends of the latter extending beyond the upright pipes. Secured to the lower ends of the pipes 72 and 73 are clamps 74 and 75 for securing the bracket to the main supports 76 and 77 of the harrow. These clamps are so made as to permit the main supports 76 and 77 to be rotated therein. The ends of the pipes 71 are flattened and in the flattened portions are provided holes 71a through which arcuate rods or hinge portions 78 extend serving as hinges for the shield, the hinge portions 78 being secured to the inner edge of the shield member. As a preventative against any binding of the hinges, a washer 78b is welded to the inner end of each rod or hinge portion 78. With this type of hinge the shield may be removed from the harrow by first tilting it vertically to the position shown in Fig. 12. The free edge portion of the shield is supported, in its lowered position, by brackets 79 secured to the outside apron of the shield member. These brackets engage and rest upon the extended portions of the main supports 76 and 77 of the harrow.

Though we have shown and described a particular construction, combination and arrangement of parts and portions, and certain modifications thereof, we do not wish to be limited to this particular construction, combination and arrangement, nor to the modifications, but desire to include in the scope of our invention the construction, combination and arrangement substantially as set forth in the appended claims.

It will be noted that in the several modifications, if it is desired to make the shield means wider, an additional shield member may be positioned immediately inwardly from the shield means shown and may consist merely of a plate positioned horizontally and with one edge adjacent the inner edge of the shield means shown. Such plate, designated 70, is shown best in Fig. 13 but removed in Fig. 6, the outline of the plate being shown by dotted lines only in Fig. 6. The edge of the plate adjacent the inner edge of the shield member 51 is hinged to the rod or pipe 68, and when the plate is in its lowered position it rests upon arms 69 supported at the upper ends of and extending outwardly from the uprights 62 in opposed relation to the horizontal bars 61, the arms being braced with respect to the uprights by braces 69a. With this structure, the shield members 51 and 70 may be raised separately about their pivotal axes and may be removed as a unit from the implement. This structure may be applied with slight modification to the other types of implements shown. It will be here noted that in the structures shown in Figs. 6 to 10 inclusive, the rear ends of the shield members may be provided with a construction similar to the front ends so that the same shield member may be used without change at both sides of the implement.

Having thus described our invention, what we claim as new and desire to secure by Letters Patent is:

1. In a shield structure, the combination with an agicultural implement having a draft element at its forward end, of a shield means mounted over one side thereof and extending forwardly and downwardly over a portion of the draft element, the inner edge of the shield means having an upwardly directed flange for directing foliage over the top side of the shield means.

2. In a shield structure, the combination with an agricultural implement having a draft element at its forward end, of a shield means mounted over one side thereof and extending over a portion of the draft element, the inner edge of the shield means having an upwardly directed flange for directing foliage over the top side of the shield means.

3. In a shield structure, the combination with an agricultural implement, of a shield means mounted over one side thereof and provided with an apron extending downwardly from the lateral edge thereof to the side of the implement, the forward end of the apron merging with the forward end of the shield means in angular lines directed forwardly and toward the longitudinal axial portion of the implement, the inner edge of the shield means having an upwardly directed flange for directing foliage over the top side of the shield means.

4. In a shield structure, the combination with a longitudinally adjustable agricultural implement, of a longitudinally telescoping shield means mounted over one side thereof and extending downwardly over the side of the implement.

5. In a shield structure, the combination with a longitudinally adjustable agricultural implement having a draft element at its forward end, of a longitudinally telescoping shield means mounted at one side thereof, the shield means having a nose piece extending from the draft element backwardly and pivotally and telescopically connected with the adjacent portion of the shield means.

6. In a shield structure, the combination with a longitudinally adjustable agricultural implement having a draft element at its forward end, of a longitudinally telescoping shield means mounted at one side thereof, the shield means having a nose piece extending from the draft element backwardly angularly toward and merging with the downwardly extending portion of the shield means, and also extending angularly backwardly and upwardly and merging with the upper side of the shield means.

7. In a shield structure, the combination with a longitudinally adjustable agricultural implement having a draft element at its forward end, of a longitudinally telescoping shield means mounted at one side thereof, the shield means having a downwardly extending portion at its laterally outer side and having a nose piece extending from the draft element backwardly angularly toward and merging with the downwardly extending portion of the shield means, and also extending angularly backwardly and upwardly and merging with the upper side of the shield means, the forward end of the nose piece being mounted on the draft element and the rear end of the nose piece being slidably connected in a longitudinal direction and also pivotally connected on a vertical axis with the forward end of the rear portion of the shield means.

8. In a shield structure, the combination with a longitudinally adjustable agricultural implement having a draft element at its forward end, of a longitudinally telescoping shield means mounted at one side thereof, the shield means having a downwardly extending portion at its laterally outer side and having a nose piece extending from the draft element backwardly angularly toward and merging with the downwardly extending portion of the shield means, and also extending angularly backwardly and upwardly and merging with the upper side of the shield means, the shield means having at the inner edge an upwardly directed flange for directing foliage over the top side of the shield means.

9. In a shield structure, the combination with an agricultural implement having operating mechanism, of shield means positioned over the operating mechanism and one lateral side of the implement, said shield means having a downwardly directed nose portion for raising and directing foliage over the shield means and operating mechanism; and hinge means pivotally connecting the inner edge of the shield means to the implement permitting the outer free edge of the shield means to be raised clear of the implement to permit free access to the operating mechanism.

10. In a shield structure, the combination with a longitudinally adjustable argricultural implement, of a longitudinally telescoping shield means, comprising a nose piece and rear portion, positioned over the top of one side thereof and extending downwardly over the side of the implement, and hinge means pivotally connecting the forward end of the nose piece to the draft element of the implement and the inner edge of the rear portion to t e main frame of the implement, permitting the outer free edge of the shield means to be raised clear of the implement.

11. In a shield structure the combination with a longitudinally adjustable agricultural implement, of a longitudinally telescoping shield means, comprising a nose piece and rear portion, positioned over the top of one side thereof and extending downwardly over the side of the implement, and hinge means pivotally connecting the forward end of the nose piece to the draft element of the implement and the inner edge of the rear portion to the main frame of the implement, the hinge means being so constructed as to permit the outer free edge of the shield to be raised and also to permit the whole of the shield means to be raised clear of the implement.

12. In a shield structure, the combination with an agricultural implement, of shield means positioned over one lateral side of the implement, and hinge means pivotally connecting the inner edge of the shield means to the implement permitting the outer free edge of the shield means to be raised clear of the implement, the hinge means comprising plates secured to the frame of the implement and provided with holes in the ends of the plates, and hook-shaped hinge members secured to the shield means and extending into said holes, the ends of the hooks being adapted to be withdrawn from the holes when the shield means is pivoted to a vertical position to facilitate the removal of the shield means from the implement.

13. In a shield structure of the class described, the combination with an agricultural implement having separate and adjustable frame portions, one positioned forwardly of the other and pivotally connected relative to each other at one side of the implement, the implement having also a draft element at the forward end, of a longitudinally extensible and collapsible shield means comprising a central shield member, a nose piece, and a rear end piece, the central shield member being pivotally connected at its forward portion on a vertical axis to the free end of the forward frame portion, the rear end piece being pivotally connected on a vertical axis to the rear frame portion, the rear end of the central shield member and the forward end of the rear end piece being slidably connected, the nose piece being pivotally connected on a vertical axis to the draft element and at its rear end pivotally and longitudinally slidably connected to the forward portion of the central shield member at the pivotal axis of said shield member with the forward frame portion.

JOHN M. BOWMAN.
SAMUEL BOWMAN.